United States Patent [19]

Meyer

[11] 3,754,723

[45] Aug. 28, 1973

[54] SELF-THREADING MEANS FOR TAPE

[75] Inventor: John A. Meyer, Thousand Oaks, Calif.

[73] Assignee: Burroughs Corporation, Detroit, Mich.

[22] Filed: July 12, 1971

[21] Appl. No.: 161,521

[52] U.S. Cl. ...................... 242/193, 226/91, 226/97, 242/182, 242/195

[51] Int. Cl. ...................... G11b 15/66, G11b 15/58

[58] Field of Search .................... 242/182, 183, 184, 242/185, 195, 210; 226/98, 97, 118, 91, 92

[56] References Cited

UNITED STATES PATENTS

| | | | |
|---|---|---|---|
| 3,393,878 | 7/1968 | Aweida et al. | 242/182 |
| 3,643,890 | 2/1972 | Milligan et al. | 242/182 |
| 3,645,471 | 2/1972 | Kjos | 242/182 |
| 3,627,226 | 2/1970 | Setter | 242/185 |

FOREIGN PATENTS OR APPLICATIONS

| | | | |
|---|---|---|---|
| 987,721 | 3/1965 | Great Britain | 226/97 |

*Primary Examiner*—George F. Mautz
*Attorney*—Robert L. Parker et al.

[57] ABSTRACT

Magnetic recording tape is stored on a reel coaxial with a takeup reel both of which are canted at a small angle relative to a work plane in which a magnetic recording transducer is arranged. The tape passes through vacuum storage columns, over air bearings, past the recording transducer and over a drive capstan between the storage reel and the takeup reel. The twist of the tape between the plane of the reels and the work plane is accomplished in the vacuum columns. In order to self-thread the leading end of a tape through such a path, jets of air guide the tape. At a sharp turn and location of tape twist during self-threading, a plurality of spaced apart gas jets are focused at a point near the end of the turn for guiding the tape.

9 Claims, 3 Drawing Figures

Patented Aug. 28, 1973 3,754,723

2 Sheets-Sheet 1

INVENTOR.
JOHN A. MEYER
BY
Christie, Parker & Hale
ATTORNEYS

Patented Aug. 28, 1973 3,754,723

2 Sheets-Sheet 2

SELF-THREADING MEANS FOR TAPE

BACKGROUND OF THE INVENTION

This application is related to copending U. S. Pat. application Ser. No. 70,239 entitled "Apparatus for Guiding Tape Between Two Planes" by Magne Jarle Kjos, now U. S. Pat. No. 3,645,471 and assigned to Burroughs Corporation, assignee of this application, the teachings of which are hereby incorporated by reference as if set forth in full herein.

A space saving expedient in the design of magnetic tape handling apparatus is to arrange the two tape storage reels coaxially one on top of the other. When a pair of reels is so arranged it is obviously not possible to place both the reels so that the tape travels between them and past a transducer all in a single plane. Accordingly the reels are usually canted with respect to the work surface along which the tape is transported past the transducer. Tape from one reel extends downwardly toward the work plane while tape from the other reel extends upwardly toward the work plane. Thus the tape travels along three different planes — the planes of the two reels and the plane of the work surface.

U. S. Pat. No. 3,443,766 issued May 13, 1969 in the names of Harry F. Rayfield and Magne Jarle Kjos discloses a criterion for guiding tape between first and second planes canted relative to each other without exerting a lateral force on the tape. The exertion of a lateral force on the tape is objectionable because it necessitates measures to control the lateral position of the tape, and tape wear results. According to the disclosed criterion, the tape path extends along a first plane to the intersection of the two planes, bends about an axis perpendicular to the first plane, extends for a distance along the line of intersection, bends about an axis perpendicular to the second plane, and then extends along the second plane, thus the tape twists between the two planes as it extends along the line of intersection. A significant path length must be provided along the line of intersection to prevent the tape from twisting too much between the two planes.

The aforementioned patent application employs an elongated vacuum column having a side wall along the line of intersection between the two planes in order to accommodate the twist in the tape required to make the transition between the two planes. This arrangement is entirely satisfactory once the tape has been threaded from one reel to the other and is accommodated in the vacuum column. It is desirable, however, to employ a self-threading arrangement wherein the tape is first threaded through the confined portion of its path between the two reels and subsequently dispensed to a sufficient length to pass through the vacuum column.

In order to thread the leading end of a compliant tape such as magnetic tape through a tortuous path, arrangements employing a flow of air have been devised. Such arrangements may use jets of air angled relative to the surface upon which the tape is to travel so that the tape is held adjacent the surface by Bernoulli forces. Such arrangements are satisfactory when the tape travels in a single plane and where the turns that the tape must make against the force of gravity are not unduly sharp. It is found, however, that Bernoulli forces may not be sufficient for carrying a tape around a sharp bend particularly when the bend also requires a twist on the tape from one plane to another as is required when coaxial reels are employed.

BRIEF SUMMARY OF THE INVENTION

Therefore, in practice of this invention according to a presently preferred embodiment, there are provided a plurality of spaced apart gas jets for self-threading a compliant tape. The gas jets have their respective axes converging from a region adjacent the beginning of a turn that the tape must take towards a region adjacent the end of the turn.

In a preferred embodiment of the invention, two coaxial tape storage reels are canted several degrees with respect to a work plane in which a recording transducer is arranged, focused gas jets are provided in the region where the tape path turns and also twists from the plane of one reel to the work plane in order to effect such a turn and twist against the force of gravity.

BRIEF DESCRIPTION OF THE DRAWINGS

These and other features and advantages of the present invention will be appreciated as the same becomes better understood by reference to the following detailed description of a presently preferred embodiment when considered in connection with the accompanying drawings wherein.

Throughout the drawings like numerals refere to like parts.

DESCRIPTION

Figure 1:
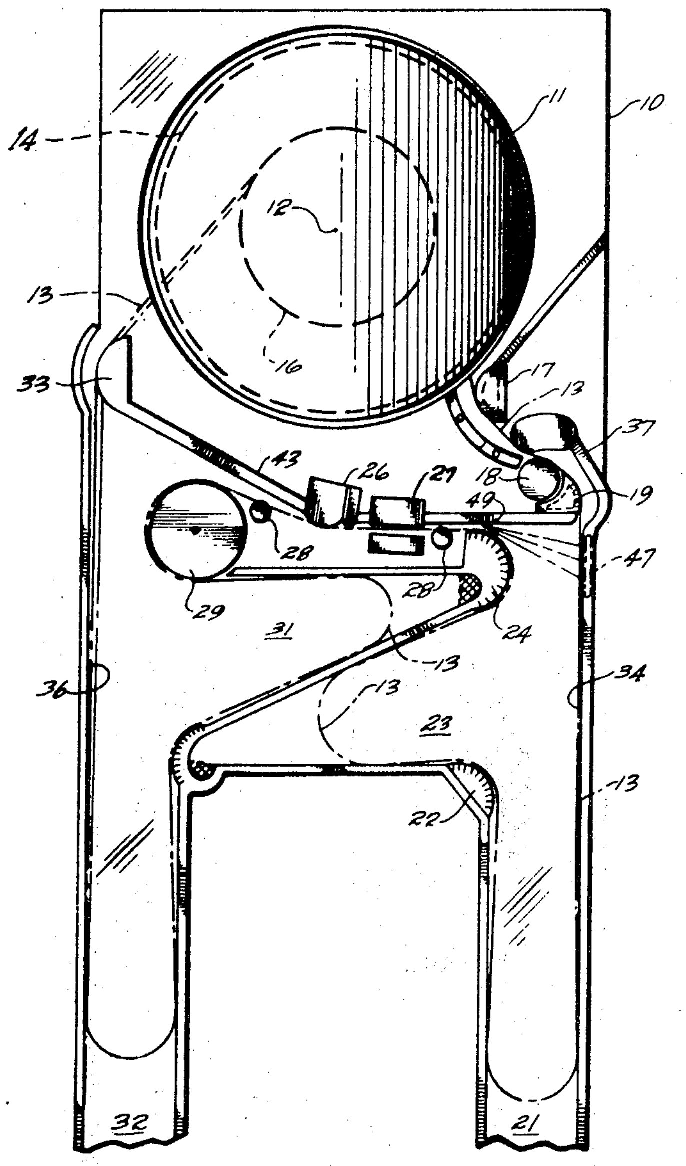
FIG. 1 is a schematic side view of a tape handling apparatus incorporating principles of this invention.

FIG. 1 illustrates semi-schematically a tape handling apparatus such as employed for reading and writing on magnetic tape, constructed according to principles of this invention. As illustrated in this embodiment the apparatus is mounted on a plate 10 behind which many of the conventional operating mechanisms such as motors, vacuum pumps, air pressure supply, and associated electronics may be mounted. A pair of coaxial tape storage reels 11, one of which is hidden behind the other in FIG. 1, are mounted on the plate 10. Typically the apparatus is arranged so that the plate 10 is vertical and the reels 11 rotate about a common horizontal axis 12 extending into the plane of the paper in FIG. 1. Preferably the two reels are independently and reversibly driven by two electric motors (not shown). The rear or hidden reel is typically known as a takeup reel and the forward reel as seen in FIG. 1 is typically known as a storage reel. In FIG. 1 a tape 13 is shown in its final threaded position for operation of the tape handling apparatus. In this position the tape 13 extends from the tape roll 14 on the storage reel 11 through other portions of the apparatus to be described hereinafter to the hub 16 of the takeup reel.

When the tape 13 is in its operating position as illustrated in FIG. 1, it extends from the roll 14 on the storage reel around a conventional air bearing guide 17 over a conventional tape cleaning wheel 18 and then over a second air bearing guide 19. From this latter guide 19 the tape falls downwardly into a vertically extending vacuum column 21 forming a looping turn near the bottom of the column and extending back up and over an air bearing guide 22 at the top of the column.

The tape then passes through a conventional vacuum buffer 23 and around an additional air bearing guide 24 from which it passes through the reading and writing path. Within the reading and writing path there are arranged a principal magnetic transducer head 26 and an auxiliary transducer head 27 past which the tape is transported for reading and writing magnetic signals thereon. A pair of compliant edge guides 28 span the two transducer heads 26 and 27 for assuring reproducible location of the tape relative to the heads.

The tape then passes around a bidirectional drive capstan 29 through a second vacuum buffer 31 and into a second vacuum column 32 similar to the first vacuum column 21. The tape passes out of the second vacuum column 32 over an air bearing guide 33 and onto a hub 16 (or roll of tape, not shown) on the takeup reel 11. It will be recognized, of course, that the path of the tape is described from one end to the other and that in conventional operation the tape may be moved from either end of this path towards the other.

The coaxial pair of tape reels 11 are canted at a small angle, for example, 3° relative to the work plane in which the recoding heads 26 and 27 and the guides 28 are arranged. Thus in FIG. 1 the right side of the reel 11 is depressed toward the plane of the paper and the left side is elevated above the plane of the paper, where the plane of the paper represents the work plane in which the recording heads and guide rolls are positioned. The outside wall 34 of the first vacuum column 21 lies along the line of intersection between the plane of the recording heads and guides, and the plane of the storage reel 11. The outside wall 36 of the second vacuum column 32 lies along the line of intersection between the plane of the recording heads and the planed of the takeup reel 11. In this manner the tape handling apparatus satisfies the criterion of the aforementioned U. S. Pat. No. 3,443,766 and the aforementioned copending application, Ser. No. 70,239, permitting twist of the tape between the two planes to occur in the vacuum columns.

Figures 2, 3:
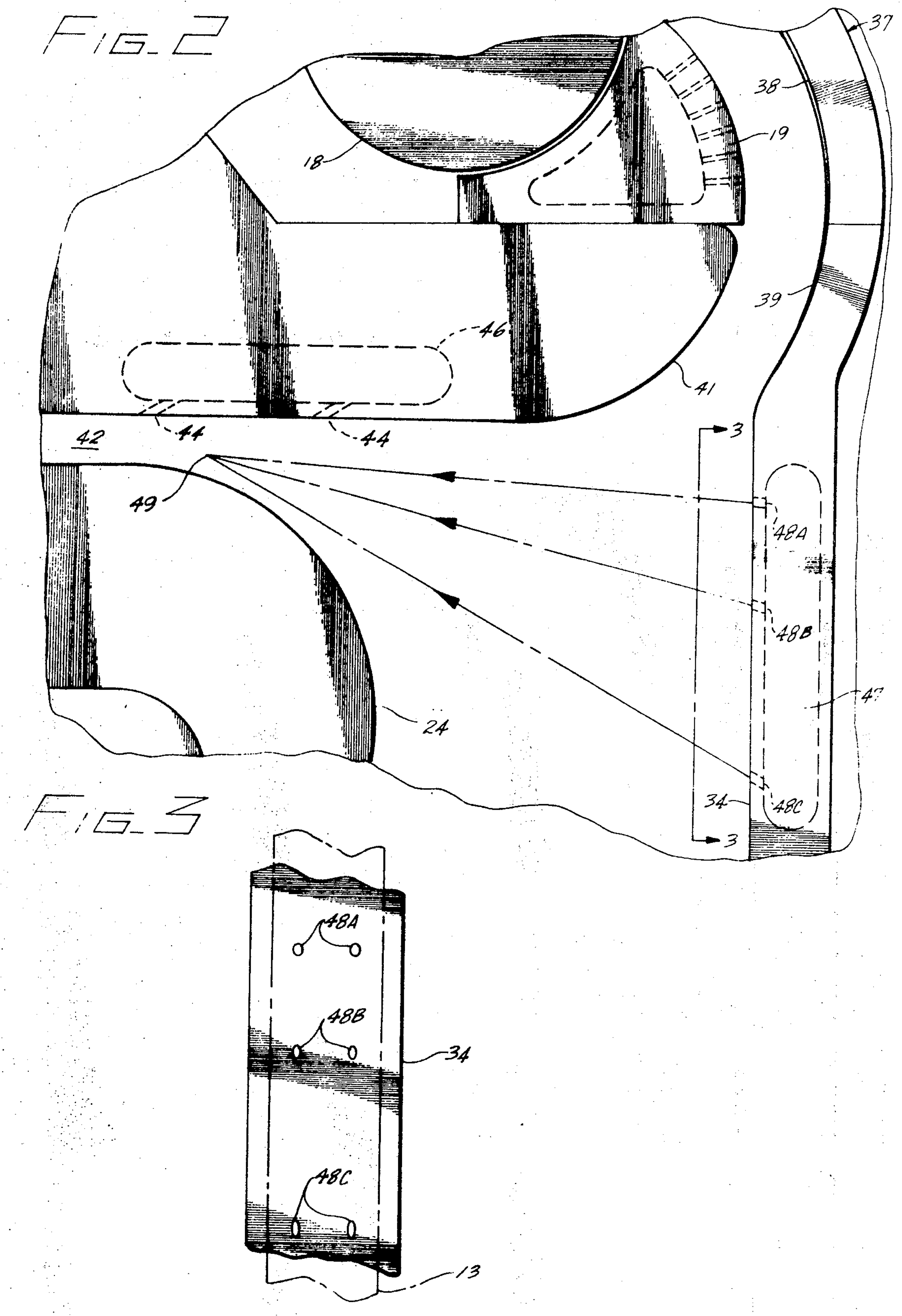
FIG. 2 is an enlarged portion of the view of FIG. 1 illustrating focused gas jets in greater detail.
FIG. 3 is a front view of the gas jets of FIG. 2.

Referring specifically to FIG. 2 which comprises an enlarged detail of a portion of the right side of FIG. 1 the air bearing guide 19 about which the tape passes is in the plane of the storage reel 11 (not shown in FIG. 2). On the other hand the air bearing tape guide 24 between the vacuum buffer 23 and the tape edge guide 28 (not shown in FIG. 2) is in the plane of the recording heads. A curved wall 37 outboard of the air bearing guide 19 has an upper portion 38 normal to the plane of the storage reel and a gradual transition portion 39 to the plane of the outside wall 34 of the vacuum column. A curved shoe 41 extends between the air bearing guide 19 and the entrance 42 of the path past the recording heads (not shown in FIG. 2).

In the illustrated arrangement the tape is self-threaded along the path hereinabove described, that is, referring to FIG. 1, a storage reel 11 having a full tape roll 14 is placed on the apparatus and the free end of the tape passes along the described path Seriatim until wound on the hub 16 of the takeup reel. The only exception to this is that the end of the tape pases directly from the air bearing guide 19 into the throat 42 of the passage past the recording heads 26 and 27 and thence along a partition 43 en route to the air bearing guide 33. Thus, upon initial threading the two vacuum columns 21 and 32 and buffers 23 and 31 are bypassed. After the threading has been completed vacuum is applied to these regions and sufficient slack introduced into the tape to permit the illustrated loops to form therein.

The self-threading is, in general, provided in a conventional manner by angled air jets (not illustrated in FIG. 1) along the tape path for guiding and propelling the tape in response to Bernoulli forces. Typical angled air jets are illustrated in FIG. 2 in the lower portion of the curved shoe 41. As illustrated therein diagonal holes 44 are connected to an air pressure manifold 46 within the shoe. The axes of the holes 44 are pointed in the desired direction of tape travel for the threading operation, and when the end of a tape reaches the influence of the jets of air from the holes it is directed forwardly and held adjacent the shoe by the Bernoulli forces generated by the rapidly moving air. Such downwardly and forwardly directed air jets are sufficient for supporting a tape against the force of gravity and also for guiding the end of the tape along the desired path once within the influence of the jets.

It has been found, however, that such angled jets may not be sufficient for carrying a tape leader around a sharp, downwardly facing turn such as, for example, around the curved end of the shoe 41. In this region gravity tends to point the tape leader downwardly away from the curved shoe and further, the inherent stiffness of the tape, even though slight, tends to resist the curving about the end of the shoe. This effect is particularly pronounced in a tape handling apparatus as provided in the illustrated embodiment where, during initial threading, the twist in the tape between the plane of the storage reel and the plane of the recording head occurs in the general region of the turn about the curved end of the shoe 41. Thus at this point the leader of the tape must be sustained against gravity and both curved and twisted against its inherent stiffness.

In order to effect the tight turn around the end of the shoe 41 an air pressure manifold 47 is provided in the outer side wall 34 of the vacuum column adjacent its top. Six holes 48 in three pairs 48A, 48B and 48C are provided through the side wall 34 into the manifold 47 to form six air streams. The holes 48 are angled so that the two holes of each pair are parallel to each other. The parallel air streams from each pair of holes are collectively considered as an air jet. Typically each hole may be about 0.060 inch diameter and the air pressure in the manifold 47 may be about one psi. The two air streams from the upper pair of holes 48A, the two gas streams from the middle pair of holes 48B, and the two gas streams from the lower pair of holes 48C converge towards a focus 49 (actually two foci since there are parallel streams in each jet) at the end of the turn that the tape must make. The foci 49 are adjacent the throat 42 into which the tape end passes and sufficiently near the jets 44 that the tape end is influenced by the forces from those jets. Thus, the air jets converge from a region adjacent the beginning of the turn that the tape must take towards a region adjacent the end of the turn.

The two holes in each pair are spaced apart a substantially equal distance on each side of the center line of the tape 13 passing in front of the holes, as best seen in phantom in FIG. 3. By employing a pair of parallel holes for forming each of the focused air jets, forces are applied along each edge of the tape rather than a single force in the center of the tape so as to balance the force thereon and assure completion of the twist of the tape as it makes the turn. The two air streams are believed also to enhance the dynamic stability of the end of the tape even in the absence of a turn and minimize flutter.

Flutter of the leading edge of the tape as it is threaded is an important consideration since this flutter may prevent the leading end of the tape from entering the throat 42 thereby preventing automatic pneumatic threading. The arrangement of focused air jets effecting a turn against gravity tends to minimize the flutter of the leading end of the tape, thus, for example, as the leading end of the tape drops from the air bearing guide 19 it first encounters the jet of air (represented schematically by the arrows in FIG. 2) emerging from the upper pair of holes 48A. This jet of air diverts the leading end of the tape towards the throat 42 into which it ultimately must enter but with less than sufficient force to cause it to enter the throat. The leading end of the tape which is already curved from the vertical path may continue to drop and encounters the jet of air from the middle holes 48B, thereby increasing the force on the leading end of the tape and on a region rearwardly of the leading end of the tape further inducing the tape to curve towards the throat 42. Continued travel of the leading end of th tape may cause it to meet the air jet from the lowermost pair of holes 48C further increasing the force on the tape assuring completeness of the turn and guiding the leading end into the throat 42 adjacent the focus 49 of the air jets. Uniform force on the tape throughout the turn as would be provided by a single air jet or pair of air streams may induce substantial flutter in the leading end of the tape and inhibit entrance into the throat 42.

Although but one embodiment of tape handling apparatus constructed according to principles of this invention has been described and illustrated herein, many modifications and variations will be apparent to one skilled in the art. Thus, for example, although illustrated with respect to a magnetic tape handling apparatus it will be apparent that the principles are equally applicable to other arrangements for automatically pneumatically threading compliant tapes such as, for example, ribbons, movie film or the like. It should also be noted that although a preferred embodiment is described with respect to a tight turn at which a twist of the tape also occurs, the broader principles of the invention are applicable to a turn in which substantially no twist is encountered. Many other modifications and variations will be apparent to one skilled in the art and it is therefore to be understood that within the scope of the appended claims the invention may be practiced otherwise than as specifically described.

What is claimed is:

1. Means for guiding a compliant tape around a turn comprising:

means for forming a first gas jet directed from a region adjacent the beginning of the turn towards a region adjacent the end of the turn; and means for forming a second gas jet spaced apart from the means for forming the first gas jet substantially within the plane including the direction of tape travel in the region adjacent the beginning of the turn and for directing the second gas jet towards the region adjacent the end of the turn so as to converge with the first gas get in the region adjacent the end of the turn, both of said means for forming gas jets being directed towards the same face of a tape.

2. A combination as defined in claim 1 further comprising:

means for forming a third gas jet spaced apart from the means for forming the first and second gas jets respectively, substantially in the plane including the path of travel of the tape and for directing the third gas jet from a region adjacent the beginning of the turn towards a region adjacent the end of the turn and converging with the first and second gas jets.

3. A combination as defined in claim 1 wherein each of the means for forming a gas jet comprises means for forming a pair of parallel gas streams, one on each side of the centerline of the tape.

4. In an apparatus for pneumatically threading a compliant tape having a plurality of gas jets for directing an end of the tape along a desired path, improved means for directing the leading end of the tape around a turn comprising:

a plurality of spaced apart gas holes on one side of the tape path at least a portion of the holes having their respective axes converging from a region adjacent the beginning of the turn towards a region adjacent the end of the turn so that gas jets therefrom converge; and means for applying gas pressure to said gas holes.

5. In an improved apparatus as defined in claim 4 a combination having at least three gas holes having their respective axes converging towards a substantially common focus and wherein at least some of the holes are directed upwardly so that gas jets therefrom lift the leading end of the tape against gravity.

6. A combination as defined in claim 5 wherein the gas holes are in parallel pairs for forming a pair of parallel gas streams from each pair of gas holes, one of said parallel gas streams being on each side of the centerline of the tape.

7. In a magnetic tape transport having a magnetic transducer, means for transporting magnetic tape adjacent the transducer in a work plane, and a pair of coaxial tape reels parallel to a plane canted relative to the work plane by a small angle, an improved means for pneumatically threading a tape end from the plane of one of the reels to the work plane comprising:

a plurality of spaced apart gas holes on one side of the tape path having their respective axes parallel to the work plane and converging from a region adjacent the beginning of the transition from the tape reel plane to the work plane towards a region adjacent the end of the transition; and means for applying gas pressure to the gas holes.

8. In an improved magnetic tape transport as defined in Claim 7 a combination having at least three gas holes having their respective axes converging towards a substantially common focus and wherein at least some of the holes are directed upwardly so that gas gas jets therefrom lift the leading end of the tape against gravity.

9. A combination as defined in Claim 8 wherein the gas holes are in parallel pairs for forming a pair of parallel gas streams from each pair of gas holes, one of said parallel gas streams being on each side of the centerline of the tape.

* * * * *